US007098963B2

(12) United States Patent
Yu

(10) Patent No.: US 7,098,963 B2
(45) Date of Patent: Aug. 29, 2006

(54) METHOD AND APPARATUS FOR ATTENUATING IMAGE NOISE

(75) Inventor: Pil-ho Yu, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 525 days.

(21) Appl. No.: 10/241,756

(22) Filed: Sep. 12, 2002

(65) Prior Publication Data

US 2003/0071920 A1     Apr. 17, 2003

(30) Foreign Application Priority Data

Oct. 11, 2001     (KR) ............................ 2001-0062670

(51) Int. Cl.
*H04N 5/21*     (2006.01)
(52) U.S. Cl. ....................... 348/620; 348/607; 348/619; 348/622
(58) Field of Classification Search ................ 348/620, 348/619, 607, 622, 623, 180, 184, 192, 193; H04N 5/21
See application file for complete search history.

(56) References Cited

U.S. PATENT DOCUMENTS 5,025,316 A * 6/1991 Darby ........................ 348/620
5,111,511 A * 5/1992 Ishii et al. ................... 382/107
5,394,192 A * 2/1995 Hackett ....................... 348/619
5,574,512 A * 11/1996 Saeger ........................ 348/620
5,880,791 A * 3/1999 De Haan et al. ............. 348/607
6,094,231 A * 7/2000 Wischer-Mann ............. 348/607
6,115,502 A * 9/2000 De Haan et al. ............. 382/260
6,195,132 B1 * 2/2001 Kimura et al. ............... 348/618
6,259,489 B1 * 7/2001 Flannaghan et al. ......... 348/620

* cited by examiner

*Primary Examiner*—Trang Tran
(74) *Attorney, Agent, or Firm*—Sughrue Mion, PLLC

(57) ABSTRACT

A method of attenuating noise contained in an image signal according to the extent of the movement of the image signal based on the amount of noise, and an apparatus therefor are provided. This method includes measuring the amount of noise in an image signal by accumulating an offset between an input image signal and a delayed output image signal for a predetermined time, detecting the extent of the movement of the input signal based on the amount of noise measured, and forming an output image by controlling the specific weight of the input image signal and the delayed output image signal according to the detected movement.

7 Claims, 4 Drawing Sheets

METHOD AND APPARATUS FOR ATTENUATING IMAGE NOISE

BACKGROUND OF THE INVENTION

1. Field of the Invention

The present invention relates to an apparatus for attenuating image noise, and more particularly, to a method of attenuating noise contained in an image signal according to the extent of the movement of a signal. The present application is based on Korean Application No. 2001-62670, filed Oct. 11, 2001, which is incorporated herein by reference.

2. Description of the Related Art

Advancements in the quality and variety of image appliances is causing demand for high-definition image appliances. In response to this demand, apparatuses for removing noise contained in image signals have been developed. In general, low-pass filters or recursive filters are used to filter out noise in a transmitted image signal.

FIG. 1 is a block diagram of an embodiment of a recursive filter according to a conventional apparatus for attenuating image noise. Referring to FIG. 1, an image signal containing noise and an image signal that is delayed for one frame by a delayer 140 are combined in a subtracter 110 to generate an offset signal. In this structure, the offset signal is limited to a lower level by a limiter 120. At this time, the lower the level of the offset signal is limited by the limiter 120, the more the noise can be reduced. However, this increases an artifact according to scene motion. Finally, an output of the offset signal, which is attenuated by the limiter 120, is combined with an image signal input by an adder 130. As a result, the noise contained in the image signal is canceled by the adder 130. Then, the image signal whose noise was attenuated is fed back to the delayer 140 to be used in the next frame.

As described above, a recursive filter is designed to operate on the basis of the correlation between frames separated at two-frame intervals. Thus, noise-reducers such as a recursive filter tend to have inadequate effects since the correlation between frames separated at two-frame intervals is relatively low.

SUMMARY OF THE INVENTION

To solve the above problems, it is a first object of the present invention to provide a method of adaptively attenuating noise in an image signal according to the amount of noise and the extent of movement of the image signal.

It is a second object of the present invention to provide an apparatus for attenuating noise in an image signal using such a method.

To achieve the first object, there is provided a method of attenuating noise in an image signal, the method including measuring the amount of noise in an image signal by accumulating an offset between an input image signal and a delayed output image signal for a predetermined time, detecting the extent of the movement of the input signal based on the amount of noise measured, and forming an output image by controlling the specific weight of the input image signal and the delayed output image signal according to the detected movement.

To achieve the second object, there is provided an apparatus for attenuating noise in an image signal, the apparatus including a filter for filtering an output image signal that is delayed for a predetermined time, a subtracter for generating an offset signal between the filtered output image signal and an input image signal, a movement detector for accumulating the offset signal generated by the subtracter, and for detecting the extent of the movement of the image signal based on the accumulated value, a first multiplier for multiplying a signal output from the subtracter and the extent of the movement detected by the movement detector, and an adder for forming an output image signal by adding the signal output from the subtracter and the signal output from the filter.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
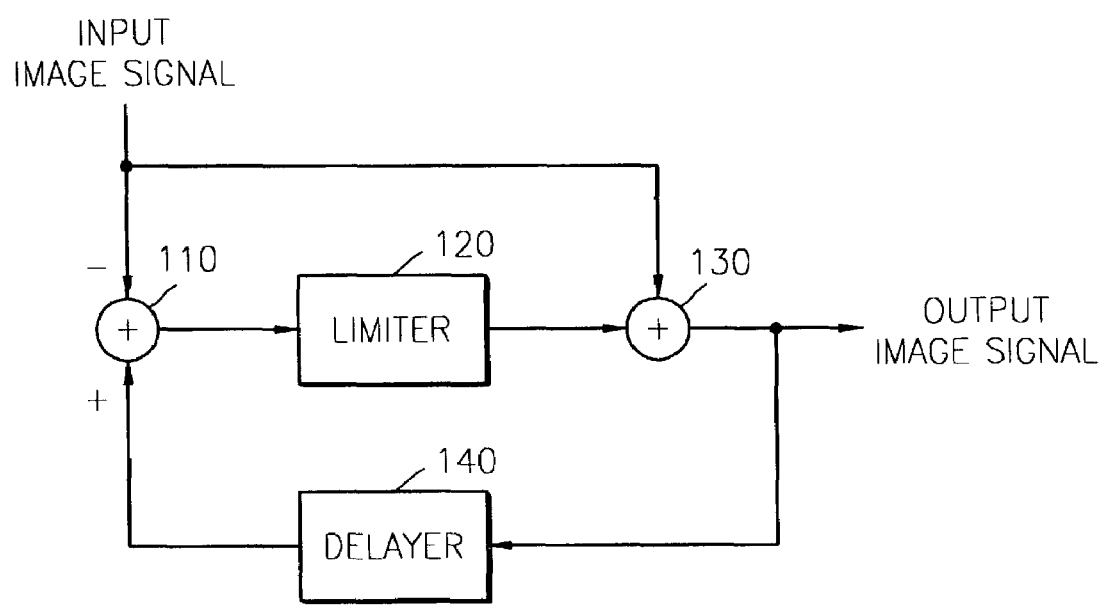
FIG. 1 is a block diagram of an apparatus for attenuating a recursive image noise that is an example of a conventional apparatus for attenuating image noise.
Figure 2:
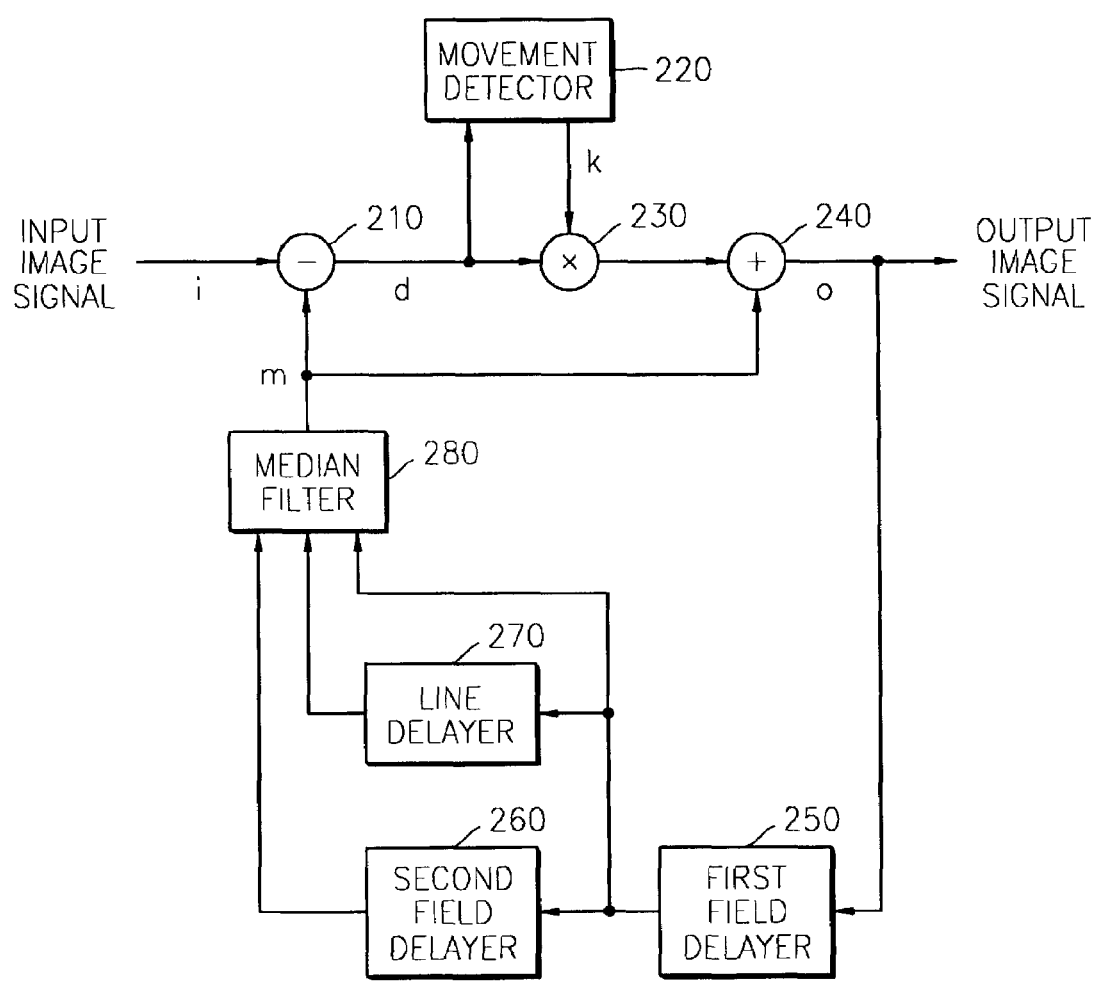
FIG. 2 is a block diagram of an apparatus for attenuating image noise according to the present invention.

FIG. 2 is a block diagram of an apparatus, according to the present invention, for attenuating noise contained in an image signal. The apparatus of FIG. 2 includes a movement detector 220 for measuring the movement of pixels of an image signal input; first and second field delayers 250 and 260 for delaying an image signal output; a line delayer 270 for delaying an image signal, which is delayed by one field, by +1 or −1 line according to the type of input current field, e.g., a top field or bottom field; a median filter 280 for outputting the mean value of image signals output from the first and second field delayers 250 and 260 and the line delayer 270; a subtracter 210 for generating an offset signal between a signal output from the median filter 280 and an image signal input; a multiplier 230 for multiplying a signal output from the subtracter 210 and a signal output from the movement detector 220; and an adder 240 for combining a signal output from the adder 230 and the signal output from the median filter 280.

In the operations of an apparatus for attenuating image noise according to the present invention, the subtracter 210 subtracts an output image signal m, which is delayed by the media filter 280, from the input image signal i containing noise, so as to form a difference signal d.

At this time, the median filter 280 calculates the mean value of (i) an image signal that is delayed by one field by the first field delayer 250; (ii) an image signal that is delayed by one field by the first field delayer 250, and then delayed by +1 or −1 line by the line delayer 270 according to the type of current input field such as bottom field and top field; and (iii) an image signal that is delayed by one field by the first field delayer 250, and then delayed by one field by the second field delayer 260. Then, the median filter 280 outputs the mean value as a delayed image signal m. Here, the top field is a field including a first line from the top of two fields constituting a frame, and the bottom field is a field including a second line from the top of two fields constituting one field.

The movement detector 220 detects the movement of each pixel of an image signal from an offset signal d output from the subtracter 210, and generates a movement parameter k.

Figure 3:
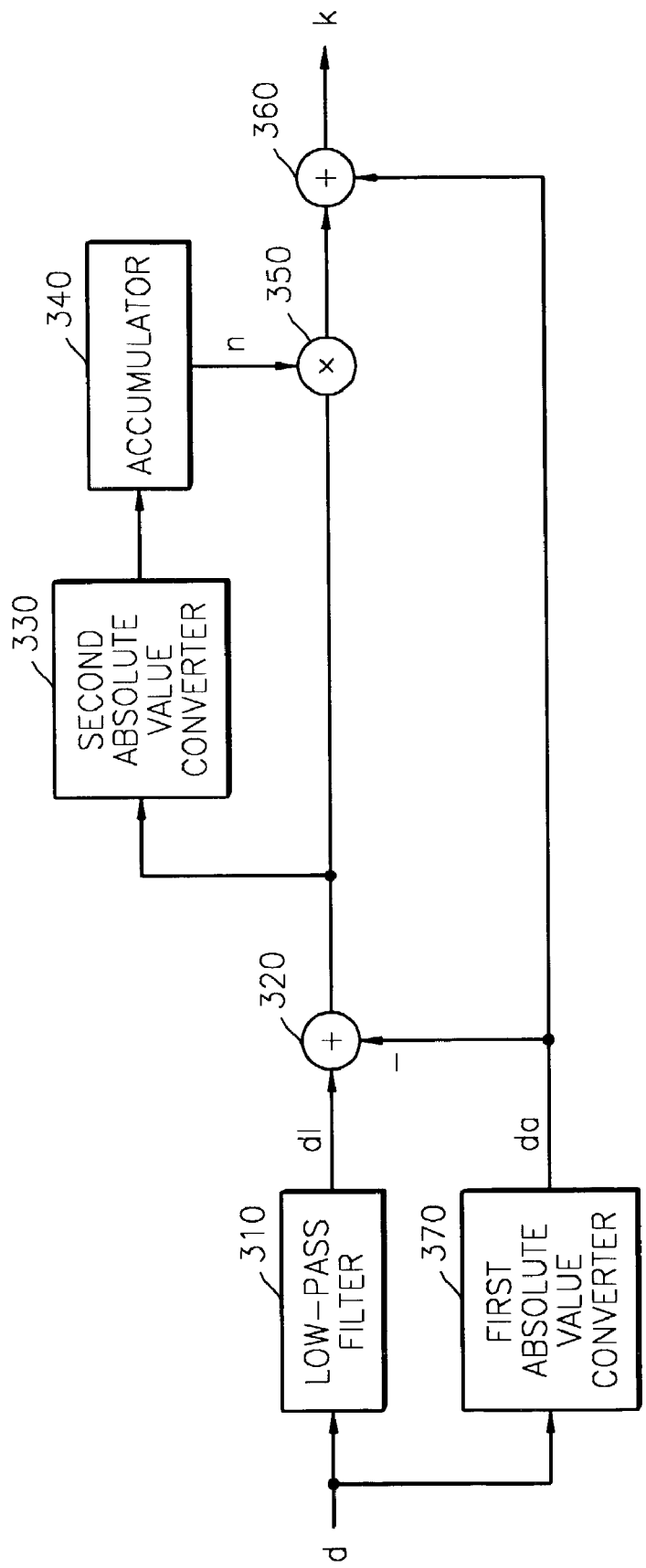
FIG. 3 is a view of the structure of a movement detector of FIG. 2.

In the movement parameter k detected by the movement detector 220 with reference to FIG. 3, the offset signal d is converted into an offset signal d1 of a low-pass component via a low-pass filter 310, and at the same time, is converted into an absolute value da via a first absolute value converter 370. The offset signal d1 having a low-pass component, and the absolute value da generate an offset signal of a high-pass component in a third adder 320. The offset signal output from a third adder 320 is converted into an absolute value by a second absolute value converter 330. The offset signal output from the second absolute value converter 330 is accumulated by an accumulator 340 for a predetermined time, e.g., one frame or one field. At this time, a value accumulated by the accumulator 340 is a value n indicating the amount of noise accumulated for a predetermined time. The value n accumulated in the accumulator 340 and the offset signal output from the third adder 320 are multiplied with each other by a second multiplier 350. An output value of the second multiplier 350 is combined with the absolute value of the first absolute value converter 370 by the fourth adder 360, which outputs the movement parameter k. The movement parameter k is calculated by the following equation:

$$k = da + n*d1 + (1-n)*da \quad (1)$$

wherein n is a number between 0 and 1.

From the equation (1), it is noted that the greater the noise n is, the more the offset signal d1 increases, and the less the noise n is, the more the absolute value da increases.

Next, referring to FIG. 2, a signal output from the subtracter 210 is multiplied by a signal output from the movement detector 220, and is output as a signal that is weighted filtered.

Then, a signal output from the first multiplier 230 is combined with an image signal m, which is delayed by the median filter 280, by the adder 240, and then constructed as an image signal o. Here, the image signal o is calculated by the following equation:

$$o = m + k*(1-m) = k*i + (1-k)*m \quad (2)$$

wherein k is a number between 0 and 1.

From equation (2), it is noted that the greater the movement parameter k is, the more the image signal i increases, and the less the movement parameter k is, the more the delayed image signal m increases. That is, an increase in the movement of an image signal results in an increase in the image signal input, and a decrease in the movement of the image signal results in an increase in the delayed image signal m.

Figure 4A:
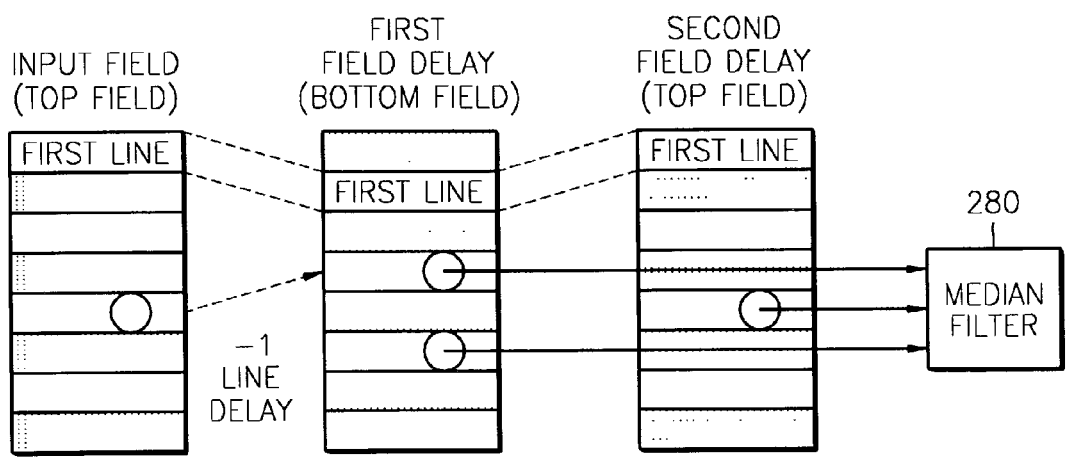
FIGS. 4A and 4B are views for explaining signals input to a median filter of FIG. 2 according to the type of a field.
Figure 4B:
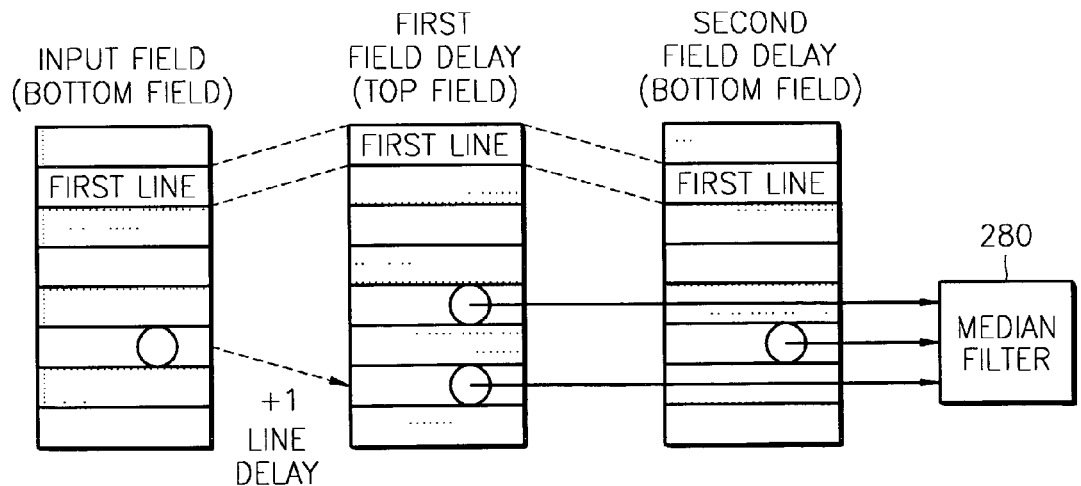

FIGS. 4A and 4B are views for explaining signals input to the median filter 280 of FIG. 2 according to the type of field. In detail, FIG. 4A is a view of signals input to the median filter 280 when an input field is a top field. More specifically, a signal that is delayed by one field, a signal that is delayed by one field and then is further delayed by −1 line, and a signal that is delayed by two fields, are input to the median filter 280, and then, the median filter 280 outputs a mean pixel value of the above signals.

On the other hand, FIG. 4B is a view of signals input to the median filter 280 when an input field is a bottom field. That is, a signal that is delayed by one field, a signal that is delayed by one field and then is delayed by +1 line, and a signal that is delayed for two fields, are input to the median filter 280, and then, the median filter 280 outputs a mean pixel value of the above signals.

While the present invention has been particularly shown and described with reference to a preferred embodiment thereof, it will be understood by those skilled in the art that various changes in form and details may be made therein without departing from the spirit and scope of the invention as defined by the appended claims.

According to the present invention as described above, noise contained in moving images, as well as in still images, can be effectively attenuated according to the amount of noise in an image signal and movement of the image signal. Further, it is possible to reject impulse noise in an image signal while adaptively delaying still images and moving images.

What is claimed is:

1. A method of attenuating noise in an image signal, the method comprising:

measuring an amount of noise in an input image signal by accumulating a first offset between the input image signal and a delayed output image signal for a first predetermined time;

detecting an extent of movement of the input image signal based on the amount of noise measured; and forming an output image by controlling the specific weight of the input image signal and the delayed output image signal according to the detected movement to attenuate noise in the output image signal, wherein measuring the amount of noise comprises low-pass filtering the first offset signal;

converting the first offset signal into a first absolute value;

generating a second an offset signal of high-pass components by combining the low-pass filtered first offset signal and the first absolute value; and converting the second offset signal into a second absolute value and then accumulating the second absolute value for a second predetermined time thereby to generate an accumulated second absolute value.

2. The method of claim 1, wherein detecting the extent of the movement comprises:

multiplying the accumulated second absolute value and the second offset signal of high-pass components; and detecting the extent of the movement of the input image signal by combining the multiplied value, and the first absolute value.

3. The method of claim 1, wherein the output image o is calculated by the following equation:

$$o = k*i + (1-k)*m$$

wherein k denotes a movement parameter, i denotes the input image signal, and m denotes the delayed output image signal.

4. A method of attenuating noise in an image signal, the method comprising:

measuring an amount of noise in an input image signal by accumulating an offset between the input image signal and a delayed output image signal for a first predetermined time;

detecting an extent of movement of the input image signal based on the amount of noise measured; and forming an output image by controlling the specific weight of the input image signal and the delayed output image signal according to the detected movement to attenuate noise in the output image signal wherein the extent k of the movement is calculated by the following equation:

$$k = n*d1 + (1-n)*da$$

wherein n denotes the amount of noise, d1 denotes a signal of a low-pass component, which is low-pass filtered, the offset signal between the input image signal and the delayed output image signal and da denotes an absolute value of the offset signal between the input image signal and the delayed output image signal.

5. A method of attenuating noise in an image signal, the method comprising:

measuring an amount of noise in an input image signal by accumulating an offset between the input image signal and a delayed output image signal for a first predetermined time;

detecting an extent of movement of the input image signal based on the amount of noise measured; and forming an output image by controlling the specific weight of the input image signal and the delayed output image signal according to the detected movement to attenuate noise in the output image signal, wherein the output image signal comprises a mean value of the output image signal that is delayed by one field, the output image signal that is delayed by one field and then further delayed by a predetermined line according to the type of input field, and an image signal that is delayed by one field and then is further delayed by one field.

6. An apparatus for attenuating noise in an input image signal, the apparatus comprising:

a filter for filtering a delayed input image signal that is delayed for a predetermined time;

a subtracter for generating a first offset signal between the filtered delayed input image signal and the input image signal;

a movement detector for accumulating the first offset signal generated by the subtracter, and for detecting an extent of movement of the input image signal based on the accumulated value;

a first multiplier for multiplying the signal output from the subtracter and the extent of the movement detected by the movement detector; and an adder for forming an output image signal by adding the signal output from the multiplier and the signal output from the filter to attenuate noise in the output image signal, wherein the filter is a median filter for outputting a mean value of the input image signal that is delayed by one field, the input image signal that is delayed by one field and then delayed by a predetermined number of lines, and the input image signal that is delayed by one field and then is further delayed by one field, according to the type of input field.

7. An apparatus for attenuating noise in an input image signal, the apparatus comprising:

a filter for filtering a delayed input image signal that is delayed for a predetermined time;

a subtracter for generating a first offset signal between the filtered delayed input image signal and the input image signal;

a movement detector for accumulating the first offset signal generated by the subtracter, and for detecting an extent of movement of the input image signal based on the accumulated value;

a first multiplier for multiplying the signal output from the subtracter and the extent of the movement detected by the movement detector; and an adder for forming an output image signal by adding the signal output from the multiplier and the signal output from the filter to attenuate noise in the output image signal, wherein the movement detector comprises:

a low-pass filter for low-pass filtering the first offset between the filtered delayed input image signal and the input image signal;

an absolute value converter for converting the first offset signal into an absolute value;

a second adder for generating a second offset signal by combining the signal filtered by the low-pass filter and the signal converted by the absolute value converter;

an accumulator for accumulating a signal output from the second adder for a predetermined time;

a second multiplier for multiplying the signal accumulated by the accumulator and the second offset signal generated by the adder; and a third adder for generating the extent of the movement of the image signal by adding the signal output by the second multiplier and the absolute value converted by the absolute value converter.

* * * * *